United States Patent [19] … [11] Patent Number: 4,953,040
Hedtke et al. … [45] Date of Patent: Aug. 28, 1990

[54] TIME CODE READER IN A DEVICE FOR REPRODUCING VIDEO SIGNALS FROM MAGNETIC TAPE

[75] Inventors: Rolf Hedtke, Darmstadt; Reinhard Fach, Griesheim, all of Fed. Rep. of Germany

[73] Assignee: Robert Bosch GmbH, Stuttgart, Fed. Rep. of Germany

[21] Appl. No.: 462,874

[22] Filed: Dec. 29, 1989

Related U.S. Application Data

[63] Continuation of Ser. No. 45,688, May 1, 1987, abandoned.

[30] Foreign Application Priority Data

May 7, 1986 [DE] Fed. Rep. of Germany ....... 3615468

[51] Int. Cl.$^5$ .......................................... H04N 5/783
[52] U.S. Cl. .................... 360/33.1; 358/336; 360/10.3; 360/14.3; 360/72.2
[58] Field of Search ........................ 360/10.1–10.3, 360/14.1–14.3, 33.1, 38.1, 49, 72.1–72.3; 358/311–312, 314, 335, 336

[56] References Cited

U.S. PATENT DOCUMENTS

| | | | |
|---|---|---|---|
| 3,921,220 | 11/1975 | Primosch | 360/72.3 |
| 4,167,759 | 9/1979 | Tachi | 360/14.3 |
| 4,195,319 | 3/1980 | Ida | 360/72.3 |
| 4,268,876 | 5/1981 | Sakamoto | 360/10.2 |
| 4,473,853 | 9/1984 | Corhery | 360/14.3 |
| 4,503,470 | 3/1985 | Mita | 360/14.3 |
| 4,507,691 | 3/1985 | Ishiguro | 360/14.3 |
| 4,550,349 | 10/1985 | Okuyama | 360/14.3 |

OTHER PUBLICATIONS

EBU–Document Tech. 30/97-E, Title page, p. 14, 4/82.

Primary Examiner—Steven L. Stephan
Assistant Examiner—W. R. Young
Attorney, Agent, or Firm—Frishauf, Holtz, Goodman & woodward

[57] ABSTRACT

Picture field ordinal numbers recorded near the synchronizing signals of video tape recordings are currently stored in a register as the tape is played back while a modulo 4 up/down counter is incremented or decremented according to the direction of tape transport. A comparison operation checks whether the picture field numbering is in step with the counter for detection of discontinuities or errors. Then a longitudinal track with coded pulses can be read from the tape. A further comparison can be made for checking reliability, bridging errors, and for detecting and indicating discontinuities in picture field numbering sequences.

5 Claims, 5 Drawing Sheets

TIME CODE READER IN A DEVICE FOR REPRODUCING VIDEO SIGNALS FROM MAGNETIC TAPE

This application is a continuation of application Ser. No. 045,688, filed May, 1, 1987, now abandoned.

This invention concerns equipment in a device for reading a video record on magnetic tape recorded in oblique tracks on the tape and provided with synchronizing portions which at the same time provide information regarding the ordinal number of a picture field within a predetermined picture sequence.

In many kinds of applications of magnetic tape devices, the precise ordered relation between the information recorded on the tape and its location on the tape is necessary. It is known to connect tape length counters either with the tape drive mechanism or with other devices driven from the tape by friction. It is disadvantageous in such cases that tape slippage can take place as the result of the friction contact, so as to lose the original relation between the state of the tape length counter and the tape position. It is therefore also known to record pulses at uniform spacing on a longitudinal track of the tape and to count these pulses during the running of the tape. Here again, the original ordered relation between tape position and counter state can be lost, by signal dropout errors. It is common to both of the systems above-described that for finding a particular location of the tape the counters must be correlated with the position of the magnetic tape. For example, at every change of tape, the tape must be rewound back to the beginning and the counter then set to zero. This is troublesome and time-consuming. It complicates the search for a desired position the tape.

In order to avoid these disadvantages, there has therefore been developed a time code for the recording of video signal on magnetic tape, whereby there is recorded in coded form on a longitudinal track of the tape the exact information of the location of every full video frame on the tape, in hours, minutes, seconds, and count of frames since the last full second. This time code is read out during reproduction and furnishes the exact position the tape. A special problem results in the use of the time code on a longitudinal track when the magnetic tape, for purposes of reproduction, is run not at the nominal speed, but substantially more slowly for obtaining special effects or for purposes of editing. Then the pulse sequence can no longer be read with sufficient reliability when the recording was done at normal tape speed, which means, for video signals encoded according to the PAL system, a data rate of 2000 bits per second or, in the case of video signals encoded according to NTSC standard, a data rate of 2400 bits per second.

In the case of magnetic tape machines with revolving magnetic heads for recording video information in oblique tracks on the magnetic tape, the relative velocity between the magnetic heads and the magnetic tape, which can be calculated by vectorial addition, varies only slightly with changes in tape transport speed. From recognition of this fact, therefore, the time code information has been in more recent times recorded in the oblique tracks by the revolving magnetic heads, together with the video information. The time code information is then indeed readable at low tape transport speeds, but it is not readable, however, at high tape transport speeds. Any attempt to combine both recording methods for the time code information runs into increased apparatus expense and leads to difficulties in transition ranges between low and high speeds.

SUMMARY OF THE INVENTION

It is an object of the present invention to provide improved time code reading equipment which makes possible reliable reading of the time code information recorded on magnetic tape at all tape speeds at which the tapes can be driven.

Briefly, the current ordinal number of a picture field is at all times stored in a register and an up-down counter is provided for forming an incremental/decremental count result, these being correlated in such a way that by comparison of the register content with the count results of the up/down counter, the picture field information obtained from the oblique tracks on the tape can be self-checked.

It is particularly advantageous to provide a picture field decoder logic circuit by which the information regarding which picture field is currently being read out, can be derived from the information contained in the oblique track.

It is also advantageous to provide computing means, comprising an input register and an output register, for evaluating the data obtained by the picture field decoder logic circuit. This computes time code information from the data, checks that time code information and corrects it in case of error. Finally, it is advantageous to provide further calculating facilities in connection with those containing the input and output registers, utilizing a time code reading device and a time code output register, for carrying out arithmetic operations and comparison operations in different ways, for example in a manner dependent upon the contemporaneous transport speed of the tape, for correcting dropouts in the time code information in a longitudinal track or even for correcting reading errors.

By the combination of information from time code information recorded in a longitudinal track, and the picture field information contained in the oblique tracks, it is possible, in a method of the invention, to obtain more precise time code information at all transport speeds for which a video magnetic tape device can be operated, compared to what is available in the known reading devices for such information.

BRIEF DESCRIPTION OF THE DRAWINGS

The invention is further described by way of illustrative example with reference to the annexed drawings, in which.

DESCRIPTION OF THE ILLUSTRATED EMBODIMENTS

A certain standard for the recording of digitally coded video signals on magnetic tape contemplates the provision of time code information on a longitudinal track which is constituted similarly to the time code information for storage of analog video signals and therefore has the same disadvantges in readability at low transport speed of the tape. A method is accordingly proposed here, utilizing information which is further standardized for checking the time code information on a longitudinal track for errors and, if desired, for correcting the errors. The above-mentioned standard for recording digital coded video signals involves the following: information from the time code longitudinal track and from the control track that likewise runs in the longitudinal direction of the tape and the picture field information which is contained in the synchronization information which is recorded together with the video information in the oblique tracks. The picture field information is read with sufficient reliability at all transport speeds of the magnetic tape for which the tape machine can be set. The material to be read has a density that decreases with increasing tape transport speed, but even at high rewinding speeds it can still be adequately recognized.

Between the time code information on the longitudinal track and the picture field information in the oblique tracks there is a relation defined in EBU-document Tech. 30/97-E, page 12, published in April, 1982, according to which the picture fields 2 and 3 are assigned an even time code value and the picture fields 0 and 1 are assigned an odd time code value. This rule holds both for the recording of television signals under the PAL standard and for recording television signals under the NTSC standard.

An incremental reading method is here set forth which operates at every tape speed that can be used in the particular machine by evaluation of the readable picture field information from the oblique tracks together with the time code information contained in the longitudinal track, with substantially greater reliability than the methods heretofore known involving merely information from a longitudinal track.

Figure 1:
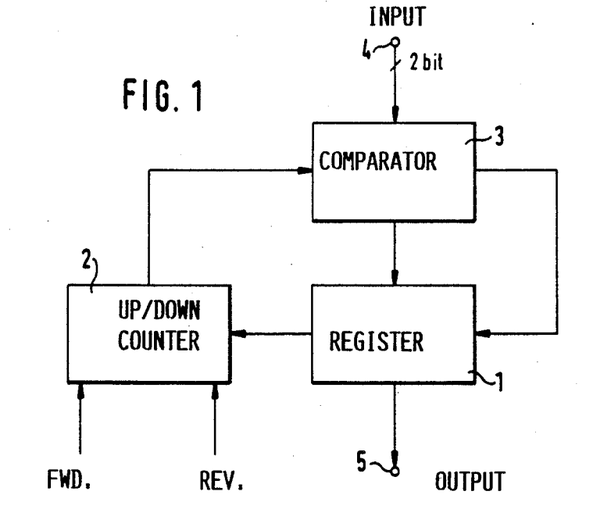
FIG. 1 is a block circuit diagram of one possible embodiment of a picture field decoder logic circuit according to the invention.

Since an oblique track, under an existing standard for recording digitally coded television signals on a magnetic tape is subdivided into two half tracks, a picture field decoder logic circuit is provided that assures that at every first appearance of the picture field numbers 0, 1, 2, 3, the new information is written into a corresponding register. In the information from the oblique tracks multiple changes of picture field numbers which may occur in a picture field transition within a single track, must not have any effect on the output of the picture field decoder logic. One possible embodiment of the picture field decoder logic circuit is shown in FIG. 1. This embodiment does not utilize information from a longitudinal track and provides self-checking of the location information from oblique tracks.

FIG. 1 shows a connection from the output of a register 1 to the input of an up-down counter 2 which operates modulo 4. Two directional inputs of the counter 2 are provided for input of the direction in which the tape is running. The output of the up-down counter 2 goes to one input of the comparator 3, which in the simplest case consists of a parallel array of AND gates. The second input of the comparator 3 constitutes the input 4 of the overall circuit. One output of the comparator 3 leads to the input of the register 1, while the second output of the comparator is connected with the loading input of the register 1. The output of register 1 is, at the same time, the output 5 of the overall circuit.

For purposes of explaining the manner of operation of the circuit of FIG. 1, it is assumed that a particular picture field value from the series 0, 1, 2, 3 is stored in the register 1. When the magnetic tape is running in forward transport, the next value must be the following value in upward sequence, i.e., after the register value 0, there come, in turn, the value 1, the values 2, 3, . . . etc. and, conversely, in reverse operation of the magnetic tape, these values succeed each other in downward sequence. A change of the register content causes the up/down counter to make a corresponding change in the counter content in the sense corresponding to the tape transport direction. The counter content is supplied to one input of the comparator 3 while at the second input of the comparator, the picture field information read out of the oblique tracks of the magnetic tape are made available. If a comparison of the content of the up/down counter 2 with the information read from the input 4 shows that these are in agreement, the value thus checked for parity is taken over into the register 1 from the comparator 3.

At the output 5 of the overall circuit, there is therefore present a value which has been checked for agreement by comparison of the content of the up/down counter with data from the input 4.

If as the result of erroneous storage or erroneous reading, picture field information from the oblique track is picked up which does not agree with the expected value provided by the output of the up/down counter, the comparison in the comparator 3 does not show a match in the compared values, so the value that is read is not transferred into the register 1. If with continuing counting the next value again shows a match, then this new value is taken into the register and provided to the output 5 of the overall circuit.

If the initial value of the register 1 is set to agree with the phase of the color carrier—therefore, 4V—correct—monitoring can be performed to determine continuously during the counting operation whether time coding continues to correspond to the current phase position of the color carrier. Upon the recognition on error, the count condition is then corrected in accordance with the direction of tape movement. The result is thereby obtained that even in the presence of heavy disturbances, the deviation from the correct counter result remains small.

Figure 2:
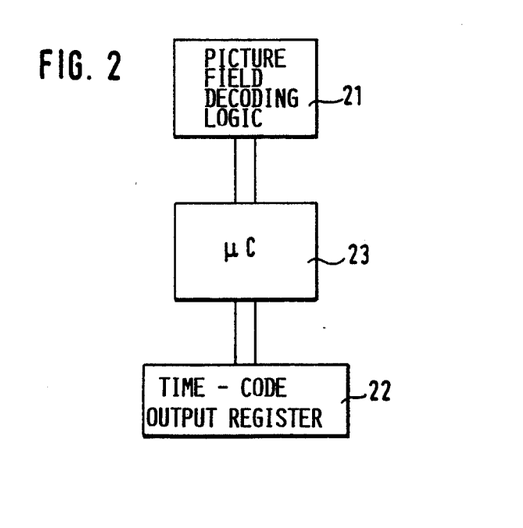
FIG. 2 is a block circuit diagram of calculating means for correcting erroneous or erroneously read out time code information.

A circuit for carrying out such a method consists, according to the case illustrated in FIG. 2, of an input register 21, an output register 22 and a computing unit 23. The input register 21 includes the picture field decoder logic connected and is thereto the register, like the register 1 of FIG. 1, in which the current picture field information is continually written in. The computing unit 23 reads the content of the input register 21, derives therefrom a time code value and writes the value thus obtained into the time code output register 22.

The circuit components 21, 22 and 23 are connected among each other by data lines.

Figure 3A:
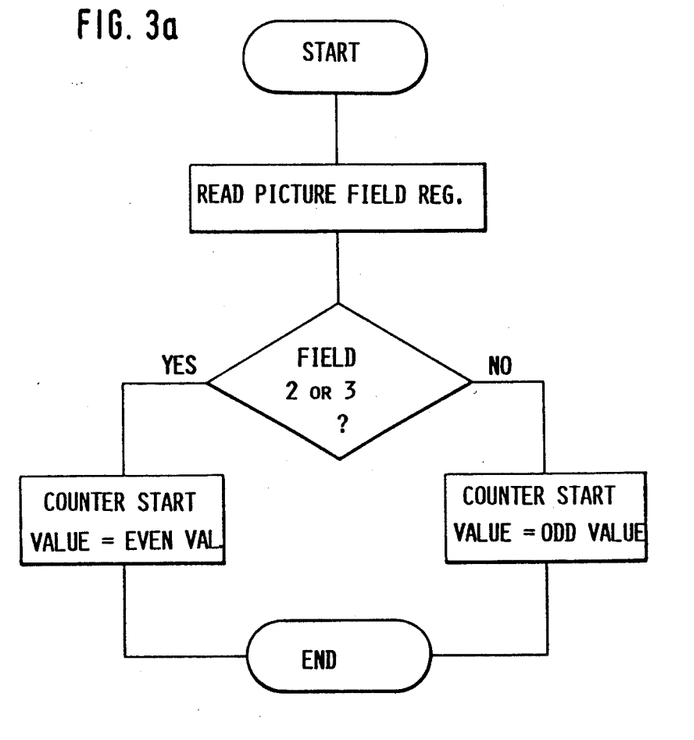
FIG. 3a is an initialization flow diagram.
Figure 3B:
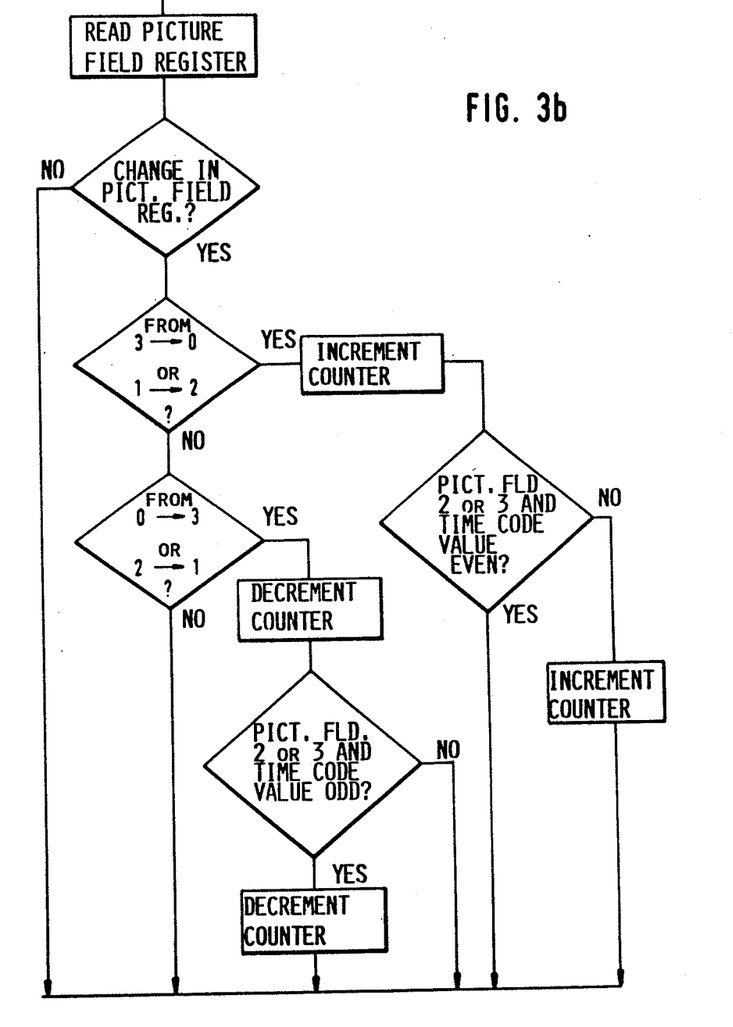
FIG. 3b is a flow diagram of the operation of the system illustrated in FIG. 2 when it is running.

FIG. 3a shows an operation flow diagram of the setting of initial value in the system is set. FIG. 3b is a flow diagram of operation when the system is running.

Figure 4:
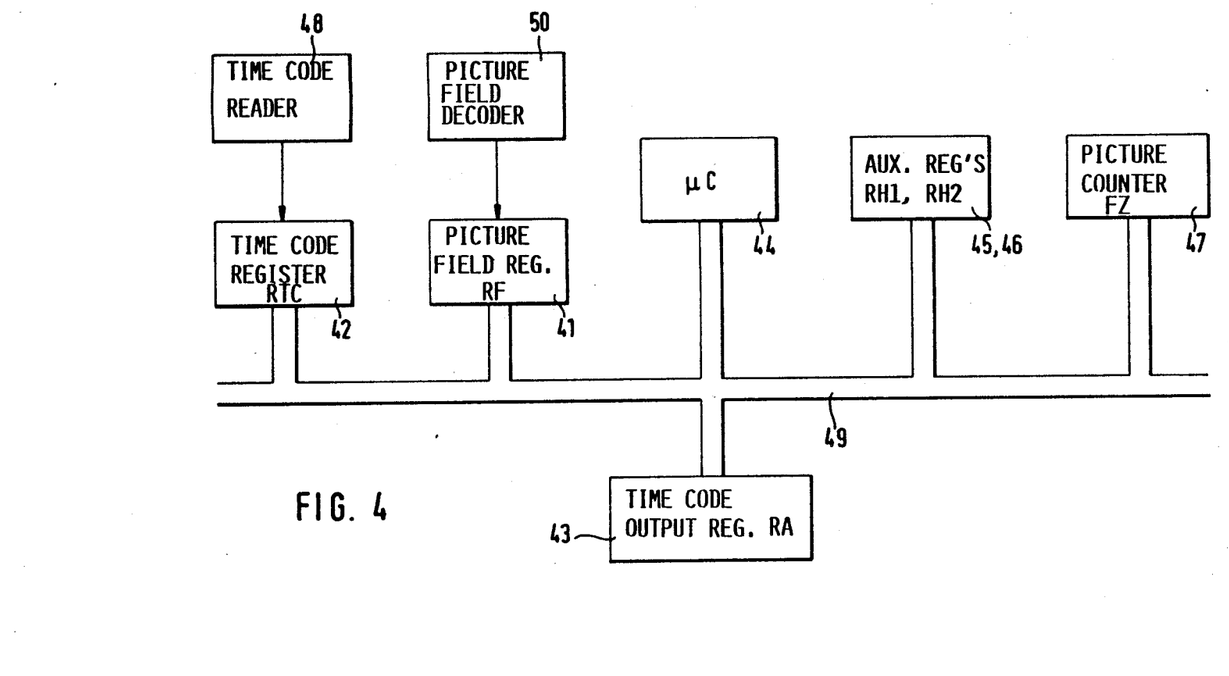
FIG. 4 is a block circuit diagram of computing means for combining the information in the longitudinal and oblique tracks of a video tape.

As stated above in connection with FIG. 1, it is assumed that a particular picture field value from the series 0, 1, 2, 3 is stored in the register 1 of FIG. 1 or, more particularly, in the picture field register 41 of FIG. 4. that register is referred to in FIG. 3a as the picture field register. There are two fields, of course, to each full picture or "frame". The first frame includes fields 0 and 1 and the second frame includes fields 2 and 3. Frame 0 is referred to as odd and frame 1 is refer red to as even, because it is the second one. FIG. 3 indicates the determination of whether the information in the picture field register refers to the field of an even or odd frame by determining whether or not the field number in the picture field register is or is not one of the numbers 2 and 3. This is expressed, in the language of flow diagrams in FIG. 3a as the question "field 2 or 3?" If the answer is "yes" to that question, an even value is used for the starting of the picture counter and otherwise an odd value is used therefor.

The counter is counter 2 of FIG. 1 or the picture counter 47 of FIG. 4. Since there are two fields for each picture, it is necessary to store 2 bits in the picture field register to identify each field of a sequence of 4 fields.

FIG. 3b shows the reading of the picture field register in operation once the picture counter has been properly started. The first decision is whether the picture field register content has changed and then, if it has, possible changes from the content 3 or 1 are first examined to determine whether the count has advanced to a new frame. If so the picture counter is incremented. If not it is determined whether the content has changed from the content 0 or 2 in the reverse direction, which is the test for whether the tape has gone backwards to another frame, in which case the counter is decremented. All other changes are disregarded and the process in any such case returns to the top of FIG. 3b. For a check on the validity of the decisions, after each incrementation or decrementation it is determined whether or not the picture field content agrees with the longitudinal track's time code identification of the picture as even or odd when the picture field content, as incremented or decremented, is 2 or 3. If not the counter is changed again in the same direction.

In accordance with another embodiment of the invention, an improved time code reading system is combined with the above-described incremental method for checking the time code information with the values of the time code read out from the longitudinal track of the magnetic tape. The circuit and apparatus for performing that method is illustrated in FIG. 4.

The circuit of FIG. 4 consists of:

First, an input register 41, into which there is continually written the picture field identification from information that has run through the picture field decoder logic circuit of FIG. 1;

Second, an input register 42 into which there is continually written the time code information of the time code reader;

Third, an output register 43 into which the prepared, i.e., the interpolated, time code is written;

Fourth, computing means 44 which reads the input registers 41 and 42, derives a time code therefrom by interpolation and writes the value thus determined into the output register 43;

Fifth and sixth, two auxiliary registers 45 and 46, which in alternation handle the determined time code values in accordance with system protocol, and Finally a picture counter 47.

The picture field register 41, time code register 42, auxiliary registers 45 and 46, the picture counter 47 and the time code output register 43 are connected with the computing means 44 over a data bus 49. The time code reader 48 for reading the time code values out of a longitudinal track of the magnetic tape provides its data into the time code register 42 and the picture field decoder 50 supplies the decoded picture field identifications of 0, 1, 2, 3 into the picture field register 41.

In a method for obtaining the time code by use of the circuit according to FIG. 4, the time code is read out of the longitudinal track by the time code reader 48 and written into the time code input register 42. At the same time, the picture field information from the oblique tracks are written by a picture field decoder device 50 into the picture register 41. The computing means 44 subjects the time code value in the input register 42 to a logical check and at the same time manipulates the picture and field counter 47 which operates according to the method described above in reference to FIG. 3b. With the assumption that on a magnetic tape the time codes are present in or continuously falling sequence, the time code value is taken into the output register 43 from the input register 42 only when the difference with respect to the time code value present in the output register 43 is exactly equal to a full frame. With that transfer, the picture and field counter 47 is at the same time erased.

If the difference is not equal to a full frame, a new time code value is written into the output register 43 that results from the last time code value in the register 43 and the addition or subtraction, according to the direction in which the tape is running, of the counter content of the picture and field counter 47. At the same time, the frame and field counter 47 is set to 0.

Two auxiliary registers 45 and 46 are provided because the circuit otherwise could not readily recognize time code discontinuities (jumps) on the magnetic tape which can arise, for example, from sequencing excessively different magnitudes. With every reading operation of the time code input register 42, the time code value from the auxiliary register 45 is transferred over for storage in the auxiliary register 46 and the time code value from the input register 42 is taken over into the auxiliary register 45.

If the criterion is established, taking account of the direction of running of the tape, that successive values should be present in the auxiliary registers 45 and 46, a discontinuity can be recognized and the time code which is read is taken over into the output register 43, while at the same time the picture and field counter 47 is set to 0.

By the above manner of proceeding, two results are obtained:

1. A dropout of the time code information in the longitudinal track of the magnetic tape or reading errors of the time code reader are bridged over, and
2. Time code discontinuities are recognized as soon as the time code reader 48 reads three successive values and these are evaluated.

Figure 5:
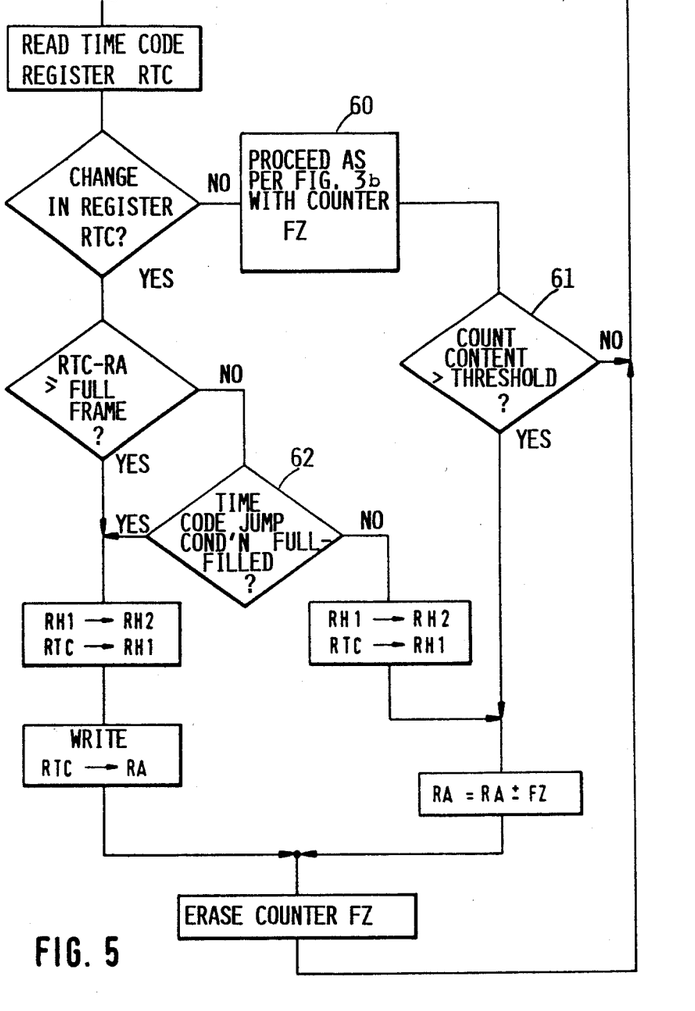
FIG. 5 is a flow diagram of the operation of the system of FIG. 4.

A flow diagram for the manner of time code evaluation when the circuit of FIG. 4 is used, is illustrated in FIG. 5.

By a prescription of a threshold value for the frequency of occurrence of loading into the output register 43, the provision of interpolation in a manner dependent upon the tape transport speed can be variably determined. At very small tape transport speeds, the minimum threshold value of 1 makes sense, so that every movement of the tape which includes or exceeds the content of one frame will produce a change of the value in the output register.

This threshold refers to the counter threshold mentioned in the flow chart at the right of FIG. 5 just above the middle.

The various components of FIG. 4 are referred to in FIG. 5 by the alphabetical designations of the registers and counters marked in the rectangular blocks of FIG. 4. In the lower left of FIG. 5, the arrows pointing to the right indicate transfer of contents from one register to another.

The first operation block 60 in FIG. 5, which functions following a determination that there has been no change in the time code register RTC signifies the performance of all the steps of the method illustrated in FIG. 3b for incrementing or decrementing the picture and field counter FZ after reading the picture field register RF.

The above-mentioned decision in block 60 takes place to assure that is an expected change in the time code register does not show up, the picture counter will increment or decrement the content of the output register. This is prevented from occurring too frequently by comparing the counter content with a threshold value at 61 of FIG. 5 to prevent excessively frequent loading into the output register when the tape is moving at high speed as above-described, so that when the counter content is less than the prescribed threshold the microcomputer returns to read the time code register again. When there is a change in the time code register the register content is compared with the content of the output register RA. If the difference if full frame or less, after writing the contents of the time code register into the auxiliary registers, the time code is written into the output register and the picture counter FZ is erased. If the time code register is changed by more than a fully frame, a decision is made as to whether the time code jump condition, indicating a discontinuity in the time code sequences rather than a misreading, if fulfilled. Comparisons are made for this purpose with the contents of the auxiliary registers 45 and 46, referred to in FIG. 5 as RH1 and RH2. If a jump is recognized at 62 of FIG. 5, the content of the time code register is processed in the same way as if the change in the register had been no greater than one full frame. If not, as shown by the right hand branch going out from the block 62, the auxiliary registers RH1 and RH2 are loaded in the usual way, and instead of writing the contents of the time code register to the output register, the output register is incremented or decremented by the picture counter FZ.

Although the invention has been described with respect to particular illustrative embodiments, it will be recognized that variations and modifications are possible within the inventive concept.

We claim:

1. A time code reading and processing apparatus for a magnetic tape machine for reproduction of video signals recorded in oblique tracks on a magnetic tape, said video signals including synchronization portions which also contain information regarding the ordinal number of a picture field within a picture sequence, said apparatus comprising:

register means for continually storing a current ordinal number of a picture field;

an up/down counter of modulo n, where n is the number of possible values of said picture field ordinal numbers, for producing a count result by incrementing and decrementing;

means responsive to every change of content of said register means for incrementing said counter with every registered change from one picture field to the next in one direction of tape transport and for decrementing the content of said up/down counter with every registered change of picture field in the opposite direction of tape transport;

means for comparing the contents of said up/down counter with picture field ordinal numbers read out from a recording of video signals in oblique tracks on a magnetic tape by said magnetic tape machine and for checking whether the contents of said counter are in step with said ordinal numbers, and means for loading said read out picture field ordinal numbers into said register means only in response to an indication provided by said content comparing means that the content of said counter matches a read-out ordinal number.

2. The time code reading and processing apparatus according to claim 1, comprising means responsive to a sequence of coded pulses read from a longitudinal track of the tape in said tape machine and means for detecting the presence of a discontinuity in said sequence of said coded pulses and for resetting said register means in the event a discontinuity is detected.

3. A method of detecting discontinuities in a vide o recording on a record carrier and errors in time-code processing during reproduction of said video recording from said record carrier, in which cyclical picture field ordinal numbers recorded adjacent to synchronization signals are reproduced, said ordinal numbers having a four-stage four-value cycle, comprising the steps of:

storing each of said reproduced picture field ordinal numbers in a register until the next reproduced picture field ordinal number is stored therein;

operating an up/down counter, in which the two least significant bits represent said ordinal number, and all but the least significant bit, together, represent a frame number, at every change of picture field ordinal number in said register during reproduction of signals from said video record carrier, including incrementing said counter for a picture field ordinal number change during movement of said record carrier in one record reading direction and decrementing said counter for a picture field ordinal number change during movement of said record carrier in another record carrier reading direction;

comparing every currently reproduced picture field ordinal number read out from said record carrier with the contemporaneous content of said counter, storing a picture field ordinal number newly read out from said record carrier whenever said newly read out ordinal number matches the contemporaneous content of said counter, and providing a discontinuity report signal when said counter falls out of step with the sequence of reproduced picture field ordinal numbers.

4. The method according to claim 3, wherein said record carrier is a magnetic tape having a coded pulse sequence recorded in a longitudinal track thereon and further comprising reading said coded pulse sequence from said track and detecting discontinuities therein by comparing current and past values, detecting a discontinuity, producing a report signal designating a field numbering discontinuity and resetting the procedure of storing and checking ordinal numbers.

5. A method of registering time code information of a magnetic tape video record during playback of said tape record with tolerance of intermittent deficiencies in a longitudinal track of said tape record in which time code information including frame count information is recorded comprising the steps of:

reading time code information from said longitudinal track into a time code register (42);

reading and decoding ordinal numbers of a four-number cycle from field identification data recorded on oblique tracks of said tape record and writing said ordinal numbers into a picture field register (41);

storing previous and pre-previous time code information of said time code register respectively in previous time code and pre-previous time code registers (45, 46) and detecting discontinuities in time code and/or frame count sequences by reference thereto;

determining for every change of time code information in said time code register (42) whether the registered time code includes a change of one frame in frame count, if not, testing for whether there is a discontinuity in frame count, then if a full frame change or a discontinuity is found, writing the newly registered time code in an output time code register (43);

during absence of a change in content of said time code register (42) and its processing as above set forth, operating a counter (47) of which the two least significant bits represent said picture field ordinal numbers, and all but the least significant bit represent a frame count, as follows:

determining, for every change in registry of an ordinal number in said picture field register whether a frame number has thereby been changed in a direction corresponding to the direction of movement of the tape and if so respectively incrementing or decrementing the counter according to tape direction movement;

determining whether the odd-or-even frame state in the time code register is consistent with the new picture field ordinal number for the direction of movement of the tape and, if not, further incrementing or decrementing the counter; and thereafter determining whether the content of the counter differs, by a predetermined number of frames dependent on the speed of movement of the tape, from a previous state thereof which was either a start state or a state for which the count content was previously added algebraically to the frame count of the output time code register, if not, then awaiting next reading of said time code register (42), but if so, adding the counter content, other than its least significant bit, algebraically to the frame count of the output time code register.

* * * * *